United States Patent [19]

Horii et al.

[11] Patent Number: 4,569,434

[45] Date of Patent: Feb. 11, 1986

[54] CONVEYOR SYSTEM FOR SORTING SMALL ARTICLES

[75] Inventors: Taichi Horii; Yasutsugu Ohbuchi, both of Shizuoka, Japan

[73] Assignee: Kabushiki Kaisha Maki Seisakusho, Hamamatsu, Japan

[21] Appl. No.: 755,975

[22] Filed: Jul. 17, 1985

Related U.S. Application Data

[63] Continuation of Ser. No. 461,980, Jan. 26, 1983, abandoned.

[30] Foreign Application Priority Data

Feb. 2, 1982 [JP] Japan .................................. 57-15130

[51] Int. Cl.⁴ ............................................. B65G 47/46
[52] U.S. Cl. ..................................... 198/365; 198/802
[58] Field of Search ............... 198/365, 478, 483, 688, 198/802

[56] References Cited

U.S. PATENT DOCUMENTS

| | | | |
|---|---|---|---|
| 2,700,453 | 1/1955 | Burbidge et al. | 198/365 |
| 3,017,024 | 1/1962 | Mumma | 198/365 X |
| 3,286,811 | 11/1966 | McWilliams | 198/365 |
| 3,342,304 | 9/1967 | Greulich | 198/655 |
| 3,841,471 | 10/1974 | Mead | 198/688 X |

FOREIGN PATENT DOCUMENTS

| | | |
|---|---|---|
| 479871 | 11/1946 | Japan . |
| 45-21774 | 7/1970 | Japan . |
| 48-66288 | 8/1973 | Japan . |
| 52-20388 | 6/1977 | Japan . |
| 53-29361 | 3/1978 | Japan . |
| 53-136864 | 11/1978 | Japan . |
| 54-13854 | 1/1979 | Japan . |
| 54-65570 | 5/1979 | Japan . |
| 55-28770 | 2/1980 | Japan . |
| 1012356 | 12/1965 | United Kingdom ................ 198/688 |

OTHER PUBLICATIONS

Automation vol. 25 No. 14 pp. 80–93—Dec. 1980.

*Primary Examiner*—Joseph E. Valenza
*Assistant Examiner*—Jonathan D. Holmes
*Attorney, Agent, or Firm*—Wenderoth, Lind & Ponack

[57] ABSTRACT

A conveyor system of a unique configuration is designed for conveying relatively small, light weight articles, such as agricultural products particularly fruits and the like, by feeding them in alignment in the travelling direction of the conveyor and at random spacing. A sorting zone is provided for sorting these articles during the conveying process. An information read-out device which is provided either at a feeding device before the entrance point of the conveyor or at a point before the sorting zone produces sorting signals in synchronism with the travel of the articles. The articles are sorted and discharged in response to the signals by dropping them to lower side places. The conveying upper surface of the conveyor consists of slat-like receiving plates spaced at a small pitch measuring only a quarter or fifth or thereabout of the size of articles to be processed. Each of the slat-like receiving plates is horizontally carried by an engaging mechanism, which disengages from the slat-like receiving plate to drop and discharge the article thereon by tilting the plate downward close to a perpendicular posture at a predetermined sorting point.

5 Claims, 16 Drawing Figures

CONVEYOR SYSTEM FOR SORTING SMALL ARTICLES

This application is a continuation of now abandoned application Ser. No. 461,980, filed Jan. 26, 1983.

BACKGROUND OF THE INVENTION

1. Field of the Invention

This invention relates to a sorting conveyor system of the kind using an automatic aligning and feeding device for sorting articles to be classified by size, weight, etc. including agricultural products such as fruits in large quantity per unit time and more particularly to a sorting conveyor system which is adapted for conveying such articles by feeding them in alignment with random spacing in the travelling direction thereof and is capable of sorting and discharging the articles even at a high conveying speed.

2. Description of the Prior Art

Sorting systems of the kind using a fruit sorting conveyor for conveying fruit thereon by aligning them with random spacing between one piece and another of the fruit and using varied kinds of measuring instruments for sorting them by appearance or size of the fruit at a certain point of the path of the conveyor have been put in practice. Such sorting systems of the prior art include the systems disclosed in Japanese Patent Publication No. Sho 52-20388, Japanese Laid-Open Utility Model Application No. Sho 53-29361, Japanese Laid-Open Patent Application No. Sho 53-136864 and Japanese Laid-Open Utility Model Application No. Sho 54-13854. In these prior art sorting systems, the article to be sorted, such as fruit, is sorted by classes on the surface of a conveyor and is discharged therefrom by means of an air jet using an air nozzle in combination with a solenoid valve in such a manner as to blow and drop the sorted fruit off one side of the conveyor.

An advantage of the above described arrangement to discharge the sorted article by an air jet is that the article is discharged from the surface of the conveyor without being touched. However, since the articles are dropped with strong air pressure applied thereto, they drop with an additional force applied thereto to accelerate their dropping speed. It is, therefore, a disadvantage of this arrangement that the impact of the sorted articles at the time of dropping becomes greater than the natural dropping impact. This is a serious drawback where the article to be sorted or classified is vulnerable to impacts, such as in the case of fruits or the like. Further, a typical fruit sorting facility wherein citrus fruits are sorted at a rate of 10 to 15 tons per hour uses a large number of air nozzles such as 90 to 100 air nozzles. These air nozzles are operated on 2000 to 2500 pieces of fruits per minute thus consuming a great amount of air. This necessitates use of a large compressor (45 KW or thereabout for example). Besides, each combination of the nozzle and solenoid valve momentarily operates (for about 1/10 second) to produce a loud sound of the air jet at a rate proportional to the above stated number of pieces of the fruit. This results in a noise that is hardly bearable by the workers. In addition to that, the arrangement is not economical because of the large amount of power consumed.

Further, there are other known automatic sorting conveyor systems of the kind having a conveyor arranged to convey articles and to sort them at a part of the conveying path of the conveyor. The details of these systems are as described in a monthly magazine called "AUTOMATION", Vol. 25, No. 14, pages 88–93, published December 1980 by NIKKAN KOGYO SHINBUN-SHA (Industrial Daily Newspaper Co.).

With respect to the sorting conveyor systems of other kinds, some systems of the type known as the slat conveyor type have been disclosed in Japanese Patent Publication No. Sho 45-21774 and Japanese Utility Model Publication No. Sho 46-15126. In addition, sorting conveyor systems of the type known as the tray type have been disclosed in Japanese Laid-Open Patent Application No. Sho 47-9871, Japanese Laid-Open Utility Model Application No. Sho 48-66288, etc. These conveyor systems of the prior art are adapted for sorting products at distribution facilities and are suited for handling relatively large and heavy articles. They require an excessively complex arrangement and excessively large space for handling relatively small, light-weight articles and cannot be readily installed within a limited space.

Another shortcoming of the prior art conveyor systems of the above stated slat or tray type is that the conveyor chain is disposed below the middle part of the slats or trays and this causes the machine oil which is applied to the chain and filth which results from the oil to soil the slats or trays. Therefore, these conveyor systems are hardly suited for handling such articles as foodstuffs, etc. that must be prevented from being soiled from a hygienic point of view.

A further shortcoming of these prior art conveyor systems is that the tiltable angle of the slats or trays is limited as they are arranged to be tilted to the left or right on a fulcrum which is disposed below the middle parts of them and thus cannot be tilted to a sufficient extent such as 70 to 90 degrees from their horizontal positions. Therefore, they are incapable of discharging such articles that have sticky lower surfaces or are not readily slidable.

It is a still further drawback of these prior art conveyor systems that, since their structural arrangement limits the possible extent of reduction in size of the slats or trays, the width of slat-like carrying or receiving plates or trays which are transversely arranged relative to the travelling direction of the conveyor cannot be sufficiently reduced, for example, to several cm or to a width between 1 and 5 cm ($\frac{1}{2}$ to 2 inches). This is because reduction of width to such a sufficient extent for sorting small articles would result in excessively large spacing between adjacent slat-like receiving plates or trays for carrying small articles. Further, for conveying and sorting small articles, they must be fed at fixed intervals to prevent more than one piece from being put on the same slat or tray. Therefore, it is impossible to feed the articles at random intervals.

SUMMARY OF THE INVENTION

It is therefore a general object of the present invention to provide a sorting conveyor system which is suited for sorting relatively small articles such as agricultural products and particularly for sorting fruits and which obviates the above stated drawbacks of the prior art systems.

It is a more specific object of the invention to provide a system wherein timing for feeding the article onto the conveyor does not have to be adjusted to the movement of slats or trays and feeding can be made at random feeding intervals; with the exception of the size, the shapes of the articles to be sorted are unlimited and, particularly, even articles of spherical shapes that tend to roll can be stably conveyed while articles that are not readily slidable can be sorted and discharged without difficulty; the article carrying part of the conveyor is free from effluent machine oil; compact, simple construction permits installation within a limited space with use of inexpensive parts; and the articles can be sorted and discharged without any excessive noises by just tilting the article carrying or conveying surfaces, so that the technical problems of the prior art systems can be solved by the system according to the present invention.

In the conveyor system according to the invention, the conveying path of a slat-like conveyor body is arranged in parallel with the travelling path of a conveyor chain. The travelling path of the conveyor chain is formed by supporting the conveyor chain by upper and lower chain receiving rails. The conveying path of the conveyor body is formed by attaching slat-like conveyor body units to chain attachments which protrude from one side of the conveyor chain. The slat-like receiving plate of each slat-like conveyor body unit is arranged to be tiltable to a desired slanting angle within a range of 90 degrees from a horizontal posture to a perpendicular downward posture. Meanwhile, tilting operation devices which cause the slat-like receiving plates to tilt are arranged above the conveyor and not below the conveyor to permit reduction in width of the conveying zone of the system. With this arrangement, a conveyor system having sorting and discharge mechanisms can be formed into a compact and simple structure.

In accordance with this invention, the conveyor system uses a wide conveyor chain having a width which is several times as wide as an ordinary standard chain. The chain travelling path is formed with upper and lower chain rails provided for preventing the chain from slanting or twisting to the left and right. The upper and lower chain rails are connected with each other on one side of the chain and are arranged preferably in such a configuration as to encompass the chain on three sides thereof. Meanwhile, the chain is provided with the attachments which protrude to the outside of the chain from the link plates thereof. Each of these attachments is provided with a holder member which is arranged to carry the slat-like receiving plate serving as article conveying body. Each of the holder members is either mounted on one link of the chain or mounted on a plurality of links of the chain. Where the chain has a small pitch, one holding member may be mounted on a plurality of links. Each of the holder members is provided with a fulcrum shaft which is arranged to pivotally support the engaging part of the slat-like receiving plate. The slat-like receiving plate is thus rotatably carried in a cantilever like manner to be tiltable from a horizontal posture to a perpendicular posture thereof. The above stated engaging part engages the holder member to horizontally keep the conveying surface of the slat-like receiving plate with an engaging element arranged in the same manner as the holder member to form each conveyor body unit having the engaging mechanism.

The conveyor body unit may be arranged either into a single type having one slat-like receiving plate for one holder member (or mounting member) or into a plural type having a plurality of the slat-like receiving plates and engaging elements mounted on one holder or mounting member.

These conveyor body units are arranged along one side of the travelling path of the conveyor chain to form a conveying path in a belt like manner with the slat-like receiving plates spaced at even fixed intervals.

Each of the above stated slat-like receiving plate is arranged to be disengaged from the engaging part by pushing a part of the engaging element which engages the engaging part by means of the operation lever of the above described operation device. With the slat-like receiving plate disengaged in this manner, the slat-like plate tilts downward by mainly its own weight to a perpendicular posture or thereabout.

The above described operation device comprises the operation lever which disengages the slat-like receiving plate and a solenoid or a cylinder or the like which is arranged in combination with the operation lever. The operation device is disposed above the travelling path of the conveyor chain and is arranged in a predetermined position within the sorting zone of the conveyor system to be operated by a sorting signal transmitted from a sorting control device. A number of the slat-like receiving plates corresponding to the size of the article to be sorted are then tilted by the operation lever in accordance with the sorting signal.

The sorting signal is synchronized with the movement of the article on the conveyor by means of a clock signal which is in synchronism with the conveyor, Therefore, the sorting signal actuates the operation device when the fore end of the article reaches the position of the operation lever. The operation device comes back to its original position when the rear end of the article reaches the position of the operation lever. With such an arrangement, the article is caused to naturally drop with only the number of slat-like receiving plates carrying the article tilted downward. In the meantime, other slat-like receiving plates located before the fore end of the article and after the rear end thereof remain not tilted.

In the case of the above described plural type, having a plurality of slat-like receiving plate and engagement elements mounted on one holder or mounting member, the width of each slat-like receiving plate can be reduced even in cases where the conveyor chain has a large chain pitch or where the mounting member has a large width. Accordingly, where two articles are not allowed to be placed on one slat-like receiving plate for a sorting process, the plural type permits feeding of the article at smaller intervals for increased conveying capacity.

In the conveyor system according to the invention, the conveyor body units travel while the conveying surfaces of them are tilted every time the article is sorted and discharged at the sorting zone, the conveyor body becomes devoid of some conveying surfaces at the end of the sorting zone while it keeps on travelling. The reverse side of tilted slat-like receiving plates are therefore brought into sliding contact with a restoring rail which is arranged preferably at the end portion of the conveying path to lift up the tilted plates to their original horizontal positions and to bring their engaging parts into engagement with the corresponding engagement elements within a short distance of travel so that the conveying surfaces can be all restored to their original positions before their arrival at the fore end of the conveyor system.

The above stated restoring rail may be arranged between one sorting part and another to restore the conveying surfaces every time an article is sorted and discharged.

In a preferred mode of embodiment of the invention, the upper surface of each slat-like receiving plate which constitutes a conveyor surface is covered with upright hair which is made of a soft and resilient material and formed in a manner, for example, like an artificial lawn. Although the upright hair is not needed for conveying a relatively hard and stable article, it serves to prevent rolling movement of articles of a spherical shape such as fruits that tend to roll over the conveyor surface during a conveying process. Another advantage of the upright hair arrangement is that the upright hair facilitates a discharging action on sticky articles that tend to stick to the conveyor surface or such articles that do not readily slide down by gravity even when the slat-like plate is tilted.

In the conveyor system according to the invention, the travelling path of the conveyor chain and the conveying path formed by the conveyor body units are separately provided left and right paths in parallel with each other. This arrangement permits washing of the conveying surfaces of the conveyor body units by vertically tilting them at a part of the conveying path between the end of the sorting zone and the fore end of the path. Therefore, foodstuffs can be hygienically conveyed and sorted even when the conveying surfaces are soiled by foodstuffs.

The sorting control device to be employed in the sorting conveyor system according to the invention can be arranged in accordance with known technology employed in the conventional sorting devices. In other words, the device may be arranged as a feeding device to be installed for a process preceding the sorting conveyor system such as the device disclosed in Japanese Laid-Open Patent Application No. Sho 54-65570, or as an information read-out device to be arranged before the sorting zone to read out information on the articles to be conveyed and sorted, such as the devices disclosed in Japanese Laid-Open Patent Application No. Sho 53-136864 and Japanese Patent Publication No. Sho 54-21774. Anyway, the device can be arranged to actuate the operation device by means of a signal produced in synchronism with the travelling movement of the articles.

In the conveyor system according to the present invention, the conveyor body units form a conveying path. Each of the conveyor body units comprises the slat-like receiving plate, the holder or mounting member, the engagement element, a pin, a spring and a few other small parts. The conveyor system can be very easily manufactured by just mounting the conveyor body units on the attachments of the conveyor chain. The slat-like receiving plates, the upright hair material, the holder members and the engagement elements can be automatically manufactured by means of injection molding machines while the pins can be manufactured by means of a header and the springs by means of an automatic molding machine. Therefore, these parts can be manufactured at a low cost.

Further, the operation device for tilting the slat-like receiving plates to sort and discharge the articles is discretely arranged above the travelling path of the conveyor chain. Therefore, the discharging part can be arranged in any desired position in the travelling direction of the conveyor. In other words, the articles can be sorted and discharged without any sorting mechanism of the conveyor such as front and rear guide rails or change-over rails. This means that the conveyor body of the system can be manufactured before a sorting point is decided. This, therefore, permits simplification of the conveyor frame and unit production thereof.

Since the tilting operation device can be installed in any desired position after installation of the conveyor, it is an advantage that the sorting and discharging point can be altered as desired.

The above and further objects and features of the invention will become apparent from the following detailed description of embodiments thereof taken in connection with the accompanying drawings.

BRIEF DESCRIPTION OF THE DRAWINGS

FIGS. 1 (a) and (b) respectively show a plan view and side view of an embodiment according to the present invention, in which various measuring devices are provided in the travelling path.

FIGS. 2 (a) and (b) are respectively a plan view and a side view of another embodiment according to the present invention, in which various measuring devices are provided in a preceding step in advance of the conveyor system.

FIGS. 11 (a), (b) and (c) are respectively a plan view, a cross-sectional view and a partly broken away side view of the upright hair materials formed on the slat-like receiving plate.

DETAILED DESCRIPTION OF PREFERRED EMBODIMENTS

Figure 1A:
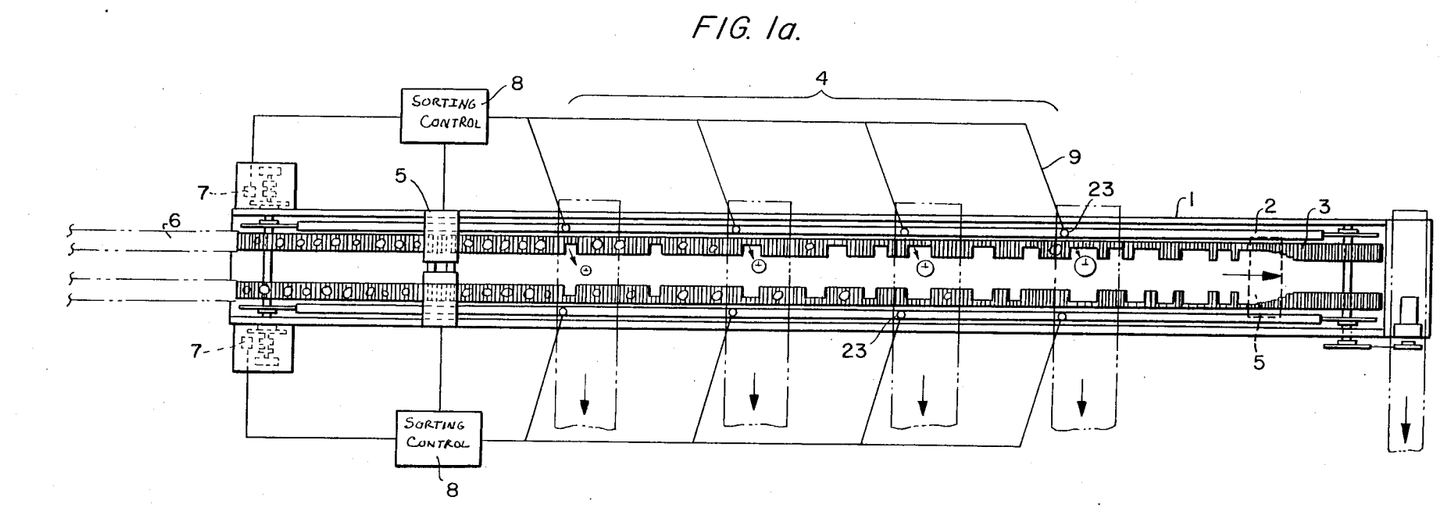
Figure 1B:
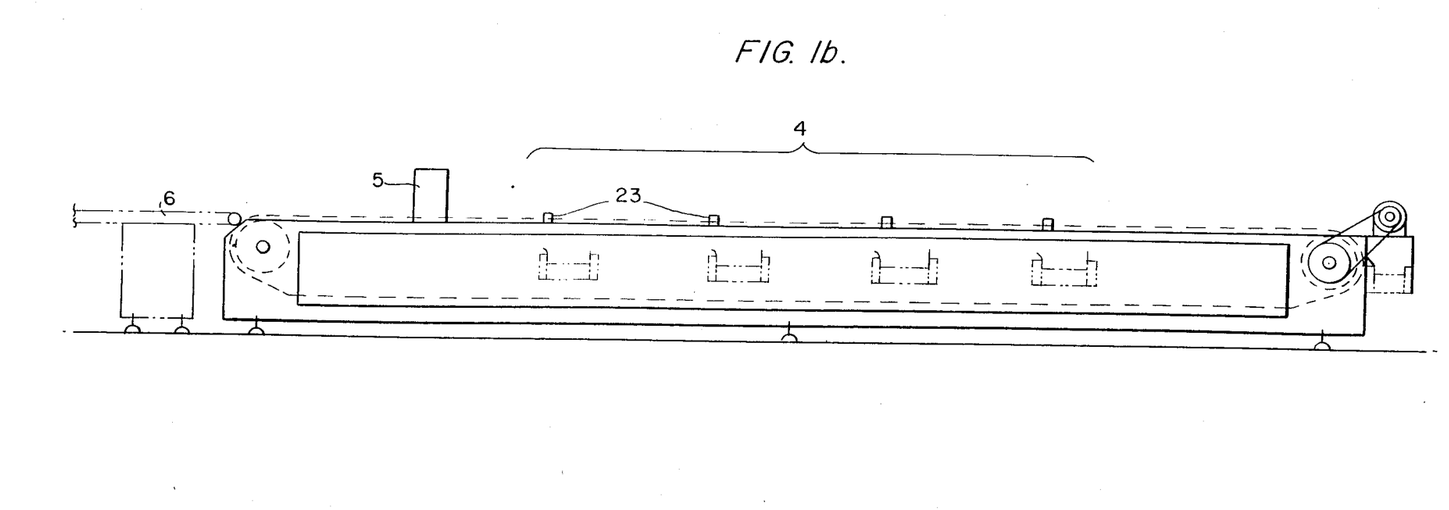
Figure 2A:
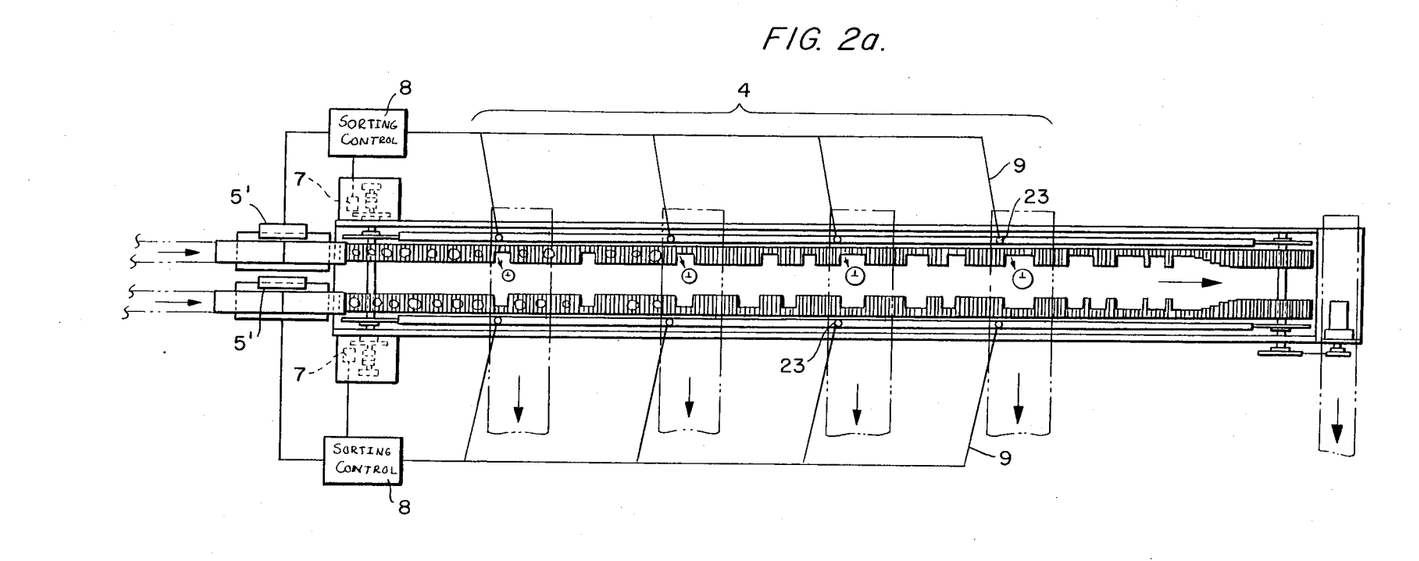
Figure 2B:
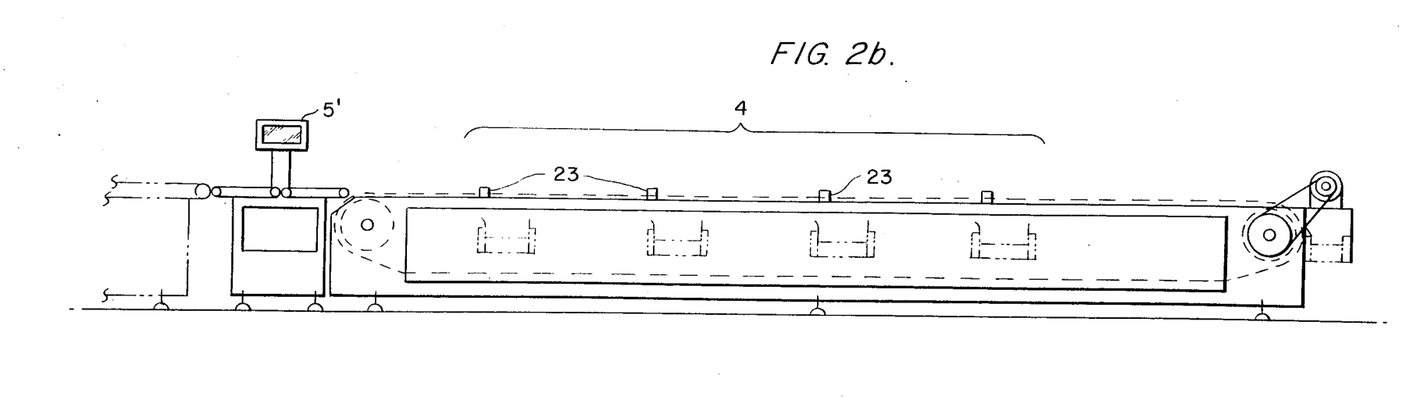
Figure 3:
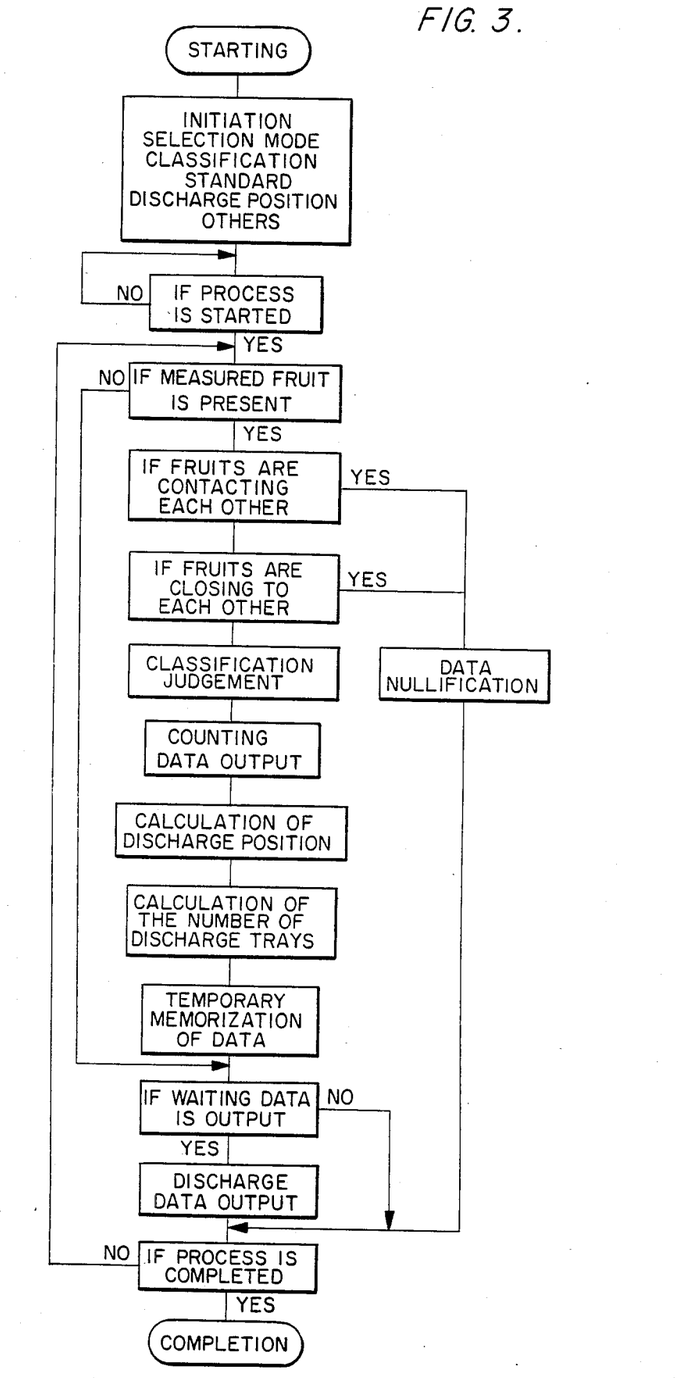
FIG. 3 shows a flow chart of the sorting control device.
Figure 4:
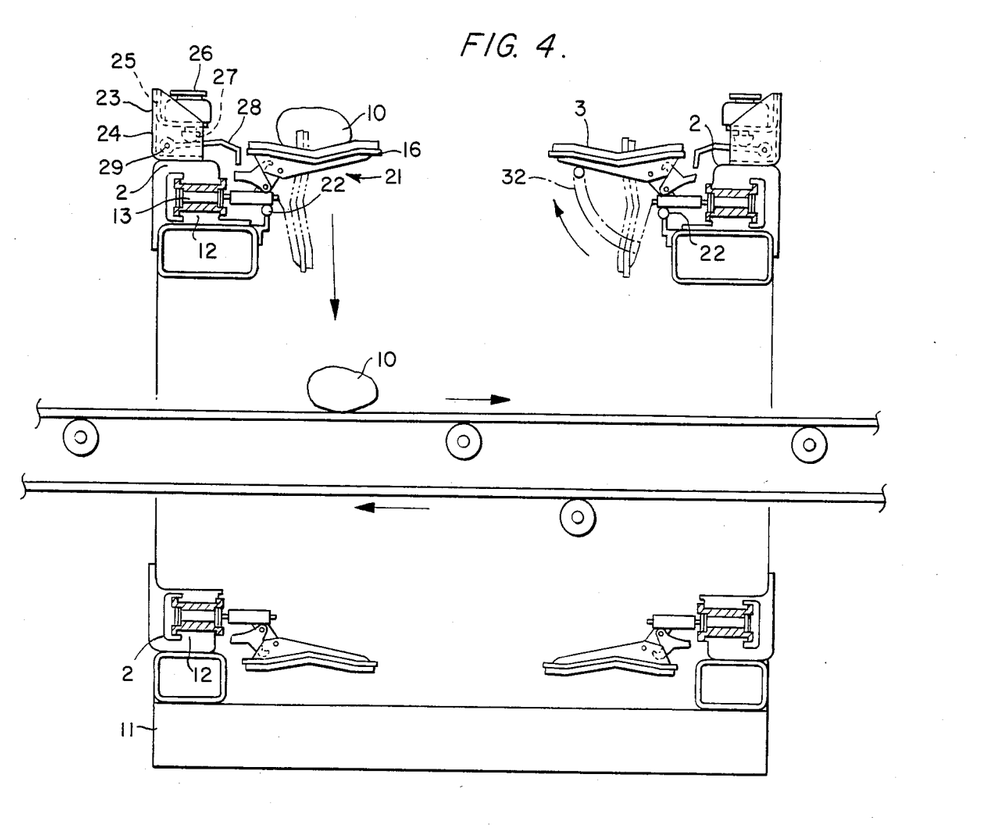
FIG. 4 is a schematic view of a conveyor system according to the present invention.

Referring to FIG. 1 and FIG. 2 which respectively show a conveyor system according to the invention as applied to an automatic sorting apparatus, the system includes a conveyor 1; a chain travelling path 2 and a travelling path 3 of slat-like receiving plates, the two travelling paths being arranged side by side in the direction of the arrows; a sorting and discharge part 4; and a sorting information read-out device 5 such as disclosed in Japanese Laid-Open Patent Application No. Sho 53-136684 and Japanese Laid-Open Utility Model Application No. Sho 54-13854. The sorting information read-out device 5 is either installed close to the entrance of the conveyor 1 (FIG. 1) or may be installed before the entrance of the conveyor 1 together with another conveyor 6 as indicated by a reference numeral 5 (FIG. 2), as disclosed in Japanese Laid-Open Patent Application No. Sho 54-65570. In the former case, a label read-out device, a bar code reader, a camera or the like for visual recognition or measurement as disclosed in Japanese Laid-Open Patent Application No. Sho 55-28770 or arrangement to manually make an information input is usable as disclosed in Japanese Patent Publication No. Sho 45-21774. In the latter case which is applicable where reading or input of information is impossible on the slat-like receiving plates, a weight sorter, automatic checker, or the like is usable. The system is provided with a synchronization clock device 7 for synchronization with the travel of the conveyor 1; and a sorting control device 8 which normally employs a microcomputer and shifts a sorting signal 9 from the information read-out device to the sorting and discharge part 4 in synchronism with an article 10 to be processed. The micro-computer performs the sorting control according to a program as shown in FIG. 3.

As mentioned in the foregoing, the system as a whole may be allowed to use components similar to known devices.

The conveyor system which is the main portion of the present invention is provided with a conveyor frame 11; chain rails 12, chains 13; and attachments 14 each of which is arranged to protrude laterally from a chain link plate. The chain 13 and the chain rail 12 are preferably arranged to be wider than the width of ordinary conveyor chains by at least 2 to 3 times. In other words, the width of the chain and chain rail corresponds to a total width of 2 to 3 rows of ordinary chains, so that the chain 13 will not be tilted nor twisted by a load imposed on one side of the chain attachment 14 even when such a load is applied to the attachment 14. The chain rail 12 is, for example, manufactured by extruding molding and has its chain travelling surface coated with an abrasion resistive synthetic resin material 12a. With the chain rail 12 arranged in this manner, the chain travelling friction and noises of the chain travelling path 2 can be lessened.

The chain 13 and the chain attachment 14 may have various shapes as shown in FIGS. 5, 6, 7 and 8.

The conveyor system is further provided with holders 15, each mounted on an attachment member; slat-like receiving plates 16; connecting pins 17 for connecting them; latch members 18 of a connecting element; and fulcrum pins 19. The pin 17 and the pin 19 pivotally connect the slat-like receiving plate 16 and the engaging piece 18 to the holder 15, respectively in such a manner that the slat-like receiving plate 16 is in a horizontal position when the engaging part 16a of the slat-like receiving plate 16 and the catch part 18a of the latch member 18 are in engagement with each other.

Figure 5:
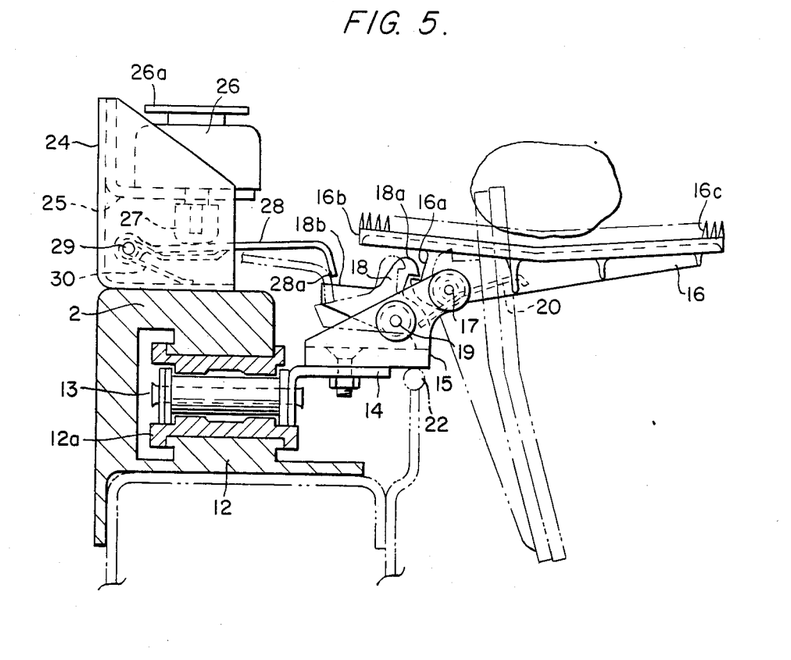
FIG. 5 is a cross-sectional view of the main portions of the conveyor according to the present invention.
Figure 6:
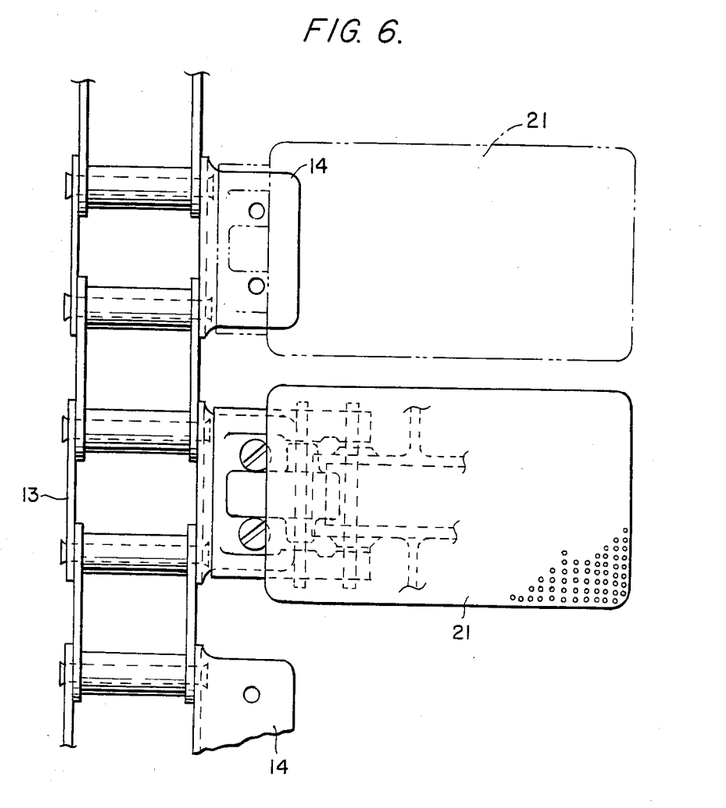
FIG. 6 is a plan view of the same.
Figure 7:
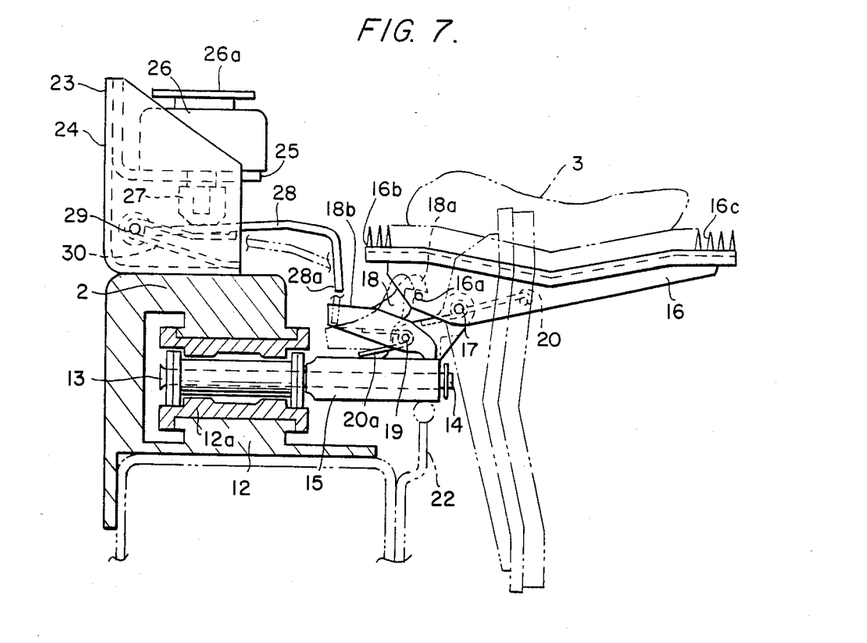
FIG. 7 is a cross-sectional view of the main portions of the conveyor modified according to the present invention.
Figure 8:
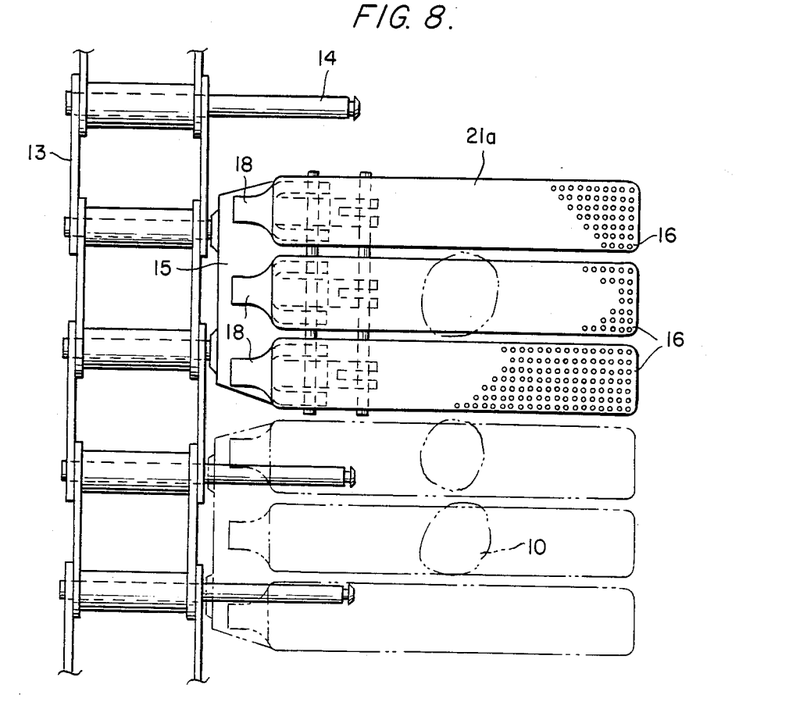
FIG. 8 is a plan view of the same.
Figure 9:
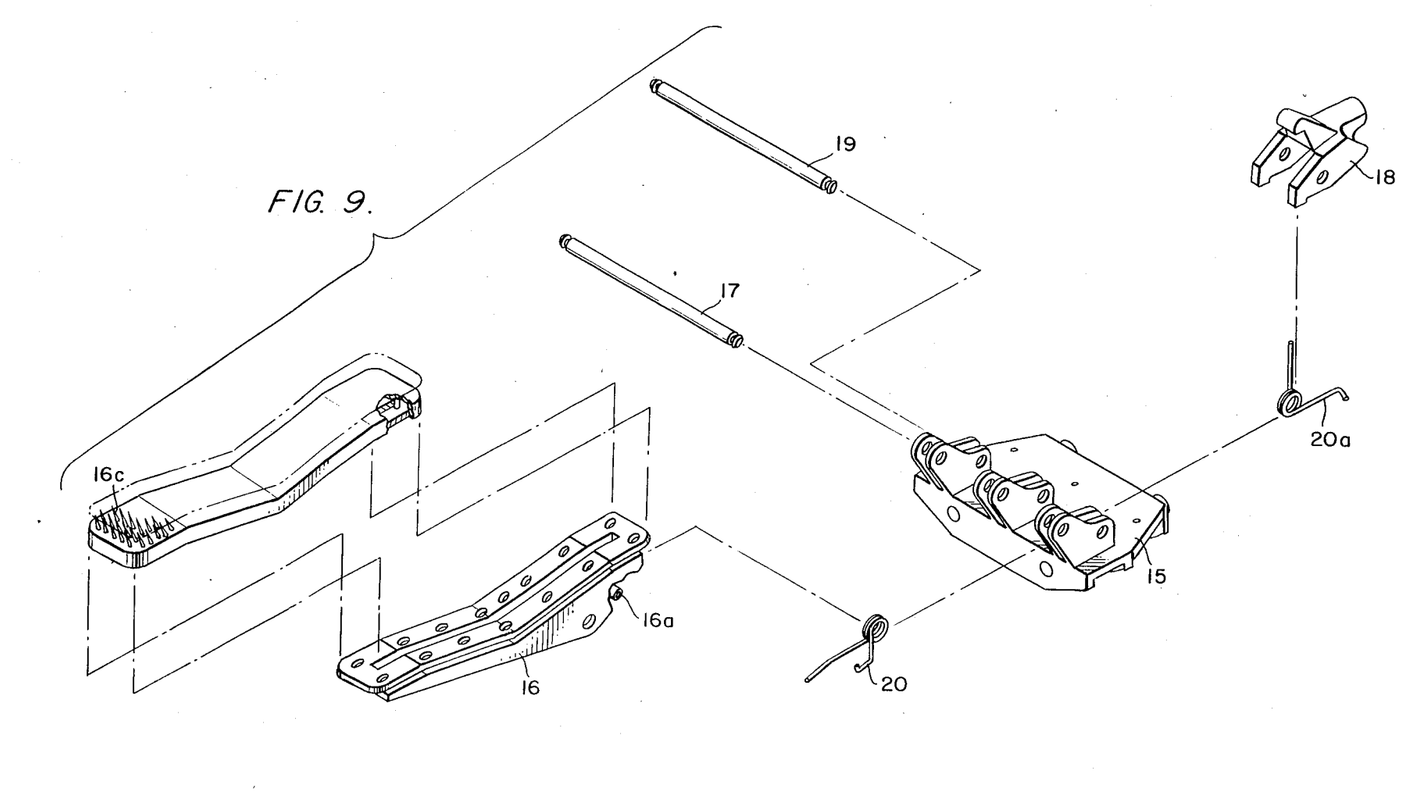
FIG. 9 is a perspective exploded view of the slat-like receiving plate and the attachment member.
Figure 10:
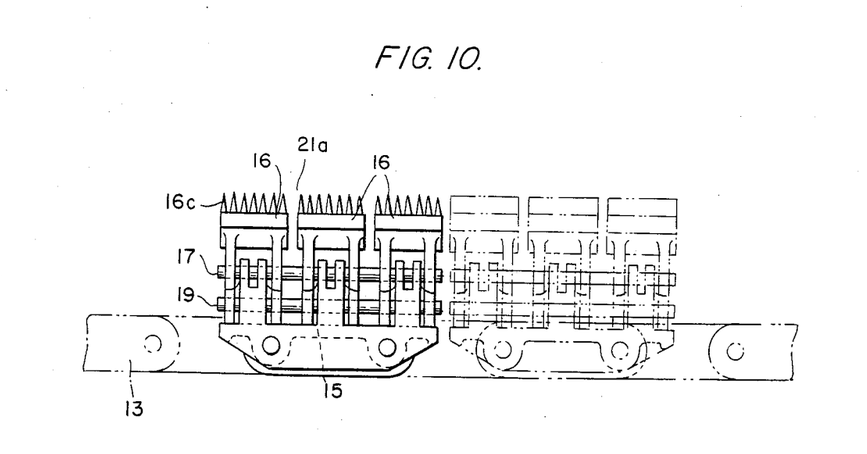
FIG. 10 is a front view of the conveyor shown in FIG. 7.

A reference numeral 20 indicates a spring means in the form of a spring which urges the latch member 18 and the slat-like receiving plate 16 so as to constantly engage with each other and not to be disengaged by vibrations or the like. The spring 20 exerts a force on the slat-like receiving plate 16 to rotate it toward a lower side part (to tilt it 70 to 90 degrees from its horizontal posture to a vertical posture) and exerts a force on the latch member 18 to bring the catch part 18a at the front cut portion thereof into engagement with the engaging part 16a the slat-like receiving plate 16. As shown in FIG. 5, the spring 20 may be attached to the pin 17 to perform the above stated two spring actions or, as shown in FIG. 7, may be replaced with spring means in the form of two springs 20 and 20a for performing the two spring actions. The spring may be arranged in any other manner as desired to serve the same purpose.

The latch member 18 is provided with a rear end part 18b for turning the latch member on the fulcrum pin 19 in the direction for disengaging the catch part 18a. The rear end part 18b is disposed lower than the upper surface of the slat-like receiving plate 16 and protrudes laterally (toward the chain rail) from the end face 16b of the slat-like receiving plate 16 and is positioned in the travelling path 2 of the chain and the slat-like receiving plate 16. These parts thus jointly form one component unit 21 of a slat-like conveyor body.

These conveyor body units 21 are attached to the chain attachments 14 and travel with the chain along a conveyor body travelling path, i.e. a travelling path 3 of the slat-like receiving plates on one side of the chain travelling path 2. The chain 13 is provided with a receiving rail 22 for supporting the attachment member. The rail 22 serves as an auxiliary rail for the purpose of alleviating a cantilever like load imposed on the chain 13 by the conveyor body units 21.

Each sorting and discharge part 4 is provided with an actuating device 23 for causing the slat-like receiving plates to tilt down, and which is discretely disposed on the chain travelling path 2 at any desired point in the travelling direction of each device. Further included in the conveyor are a stand 24; a solenoid mount 25; a solenoid 26; a pusher 27 attached to the fore end of the plunger solenoid 26; and an operation lever 28. The operation lever 28 is arranged to turn on a fulcrum pin 29 disposed at a part of the stand 24 and is provided with a fore end part 28a forming a touch cam which is formed at the fore end of the lever and is arranged to engage the rear end part 18b of the above described latch member of a conveyor body unit 21 for depressing it. The operation lever 28 is further provided with a restoring spring 30 for keeping the lever in a raised position when the lever is not in operation. This spring 30 serves to push the operation lever 28, the moving core 26a of the solenoid 26 and the pusher 27 upward to keep them in their waiting positions respectively.

A sorting signal 9 (FIGS. 1a and 2a) which is produced from the sorting control device 8 and is shifted in synchronism with the conveyor causes the solenoid 26 to be energized. With the solenoid thus energized, the pusher 27 instantaneously pushes the operation lever 28 downward with a force which is greater than the force of the restoring spring 30. Then, the fore end part 28a pushes downward the rear end part 18b of the latch members of the conveyor body unit 21. With the rear end part 18b pushed down, the engaging part 16a of the slat-like receiving plate 16 is disengaged to permit spring 20 to tilt the slat-like receiving plate 16 and thus the article 10 is discharged to a lower side part.

Figure 12:
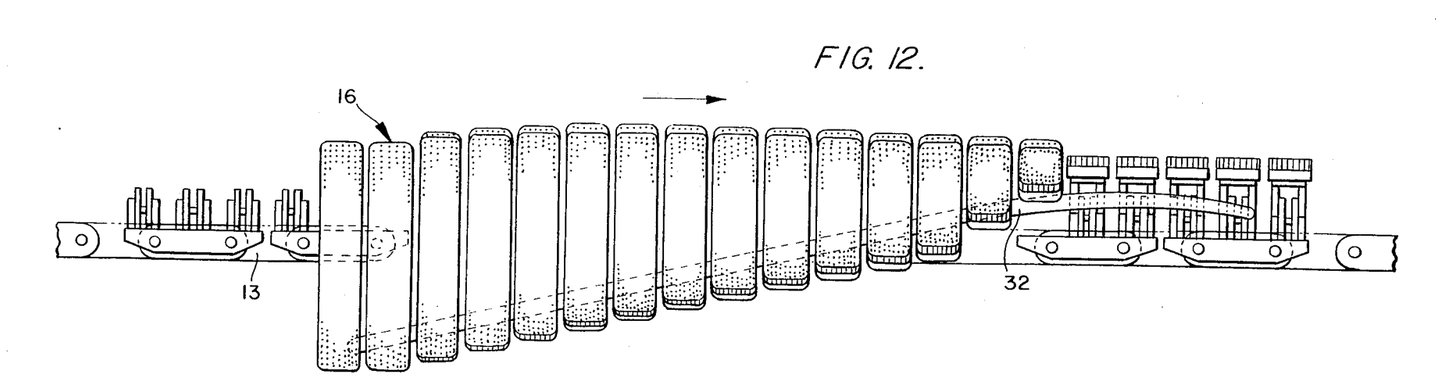
FIG. 12 schematically shows the restoring rail for restoring the slat-like receiving plates to their original attitude.

The slat-like receiving plate 16 which is tilted at the sorting and discharge part 4 is allowed to travel in the tilted state until it comes close to the fore end of the conveyor. At the fore end of the conveyor, there is provided a restoring rail 32 (see FIG. 12) which is arranged in front of a fore end sprocket to bring the slat-like receiving plate 16 back to the original horizontal position before it turns round to the returning side of the travelling path thereof. However, it is also possible to restore the slat-like receiving plate to the horizontal position thereof immediately after the article is discharged by tilting the plate at the sorting and discharge part 4.

In the case where an article that soils the upper surface of the slat-like receiving plate with moisture, powder or sticky matter, is sorted and discharged, the arrangement of the conveyor body separately from the chain travelling path permits the slat-like receiving plate to be cleaned by applying a shower S (shown schematically only in FIG. 1a) or the like from above while the slat-like receiving plate is travelling aslant after the article has been discharged.

FIGS. 7 to 10 show another embodiment of the invention wherein the conveyor is composed of multiple conveyor body units 21a. Each of these units is formed by using a plurality of slat-like receiving plates 16, a plurality of latch members 18 and a plurality of springs 20 in combination with one attachment member 15. Since there is a limit to the possible degree of reduction in size of the holder 15 depending on the pitch and size of the chain 13, the above described arrangement of this embodiment is highly suitable for efficiently conveying such articles that are smaller than the chain pitch. The conveyor chain has chain links which are arranged at a larger pitch than ordinary power transmission chains for the purpose of stabilizing the chain travel and facilitating mounting work on the attachments to be attached to the chain. Therefore, this embodiment is arranged to mount a plurality of slat-like receiving plates on each of the chain attachments so as to avoid undue increase in the width of a single slat-like receiving plate.

Figure 11A:
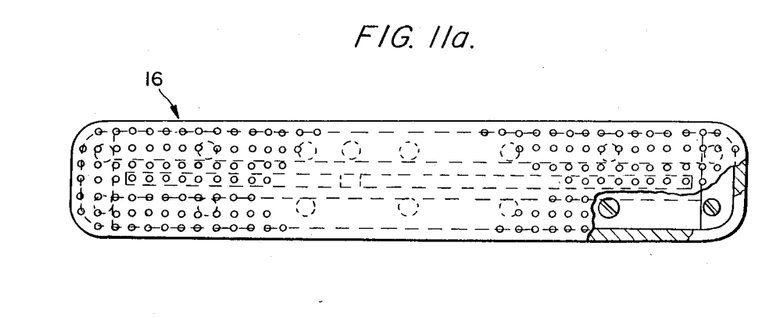
Figure 11B:
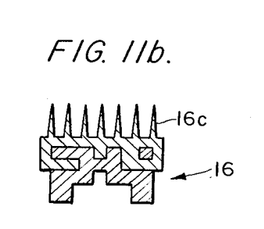
Figure 11C:
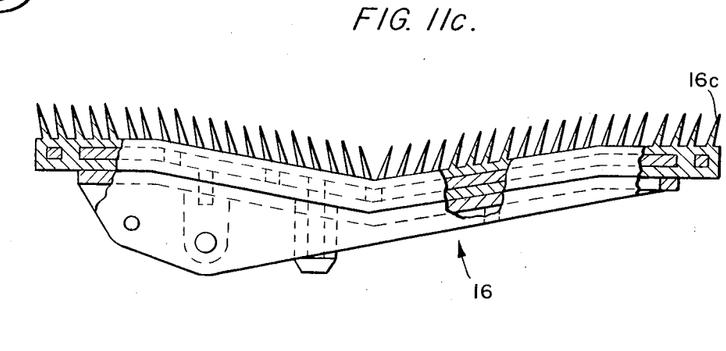

FIGS. 5, 7 and 11 further show an embodiment wherein upright hair made of a rubber or synthetic resin material or the like is provided on the upper surfaces of the slat-like receiving plates by a projection or insertion method. This arrangement is applicable where articles that tend to stick to the slat-like receiving plates are to be conveyed and sorted. In other words, even when the article 10 has a wet surface or is in a sticky state or an easily rolling shape, the article can be effectively prevented from sticking to the slat-like receiving plate by the upright hair member 16c which covers the transporting surface of the slat-like receiving plate 16 to provide a brush-like or artificial lawn-like surface. When spherical articles are treated, the hair member 16c allows the spherical articles to sink therein like a ball on a lawn to prevent it from rolling off a set place while the conveyor is on the move, so that the conveying and sorting operation can be stably performed.

As has been described in the foregoing, the conveyor system according to the invention is simply composed of unitized members and thus can be provided at a low cost and can be installed in a limited space for sorting and discharging small light-weight articles.

What we claim is:

1. A conveyor apparatus for transporting of relatively small size, such as agricultural products, particularly fruits with sperical lump shapes which roll easily and foodstuffs which should be kept free from dirt, along a transport path by supporting the articles at about a central longitudinal portion of a transporting plane extending in the direction of the transport path, and for sorting the articles, said apparatus comprising:
   a single endless conveyor chain having a travel path along and laterally of and parallel to the transport path;
   a chain rail having sliding surfaces for receiving the lower surfaces of said single conveyor chain along said travel path and at the same time holding the upper surfaces of said conveyor chain against inclination to the left or right along said travel path and preventing warpage of said conveyor chain and guiding said conveyor chain;
   a plurality of attachments fixed at spaced intervals along said conveyor chain and protruding laterally from one side of said conveyor chain outwardly of said travel path and toward said transport path;
   a plurality of slat-like receiving plates having concavely shaped upper surfaces extending from one end to the other for stably supporting the articles and preventing them from easily rolling out of the central portion of said receiving plates;
   a plurality of holders, at least one being fixed to each of said attachments, at least one connecting pin on each holder, and a receiving plate supported in a cantilever manner on each connecting pin only for rotation around said connecting pin from a horizontal position extending laterally outwardly from said attachment to a vertically downward position beside said chain conveyor, the end of said receiving plate which is toward said chain conveyor being an inner end and being spaced laterally outwardly of said chain conveyor toward said transport path, and said central portion of said receiving plates being on the other side of said connecting pin from said conveyor chain;
   a plurality of engaging mechanisms, one for each of said receiving plates, on the upper parts of said holders and below said receiving plates and normally engaging corresponding portions of said receiving plates below said inner ends thereof, without protruding beyond the upper surfaces of said receiving plates, and having inner end parts positioned between said chain rail and said receiving plates, and said engaging means being rotatable around a fulcrum in a direction for releasing the engagement with said receiving plates;
   the upper surfaces of said receiving plates forming a conveyor movable along said transport path along with said chain beside and parallel to said chain when said receiving plates are in a horizontal position; and
   at least one tilting operation device at a predetermined position along the travel path of said chain and positioned above and between the sides of said chain and having an operating lever which protrudes above the inner end parts of said engaging mechanisms and movable for actuating the engaging mechanisms for releasing receiving plates having thereon articles to be sorted so that articles are sorted at the position of said tilting operation device along the travel path of said conveyor chain.

2. A conveyor system according to claim 1, in which each of said holders has at least three receiving plates thereon and a corresponding number of engaging elements thereon, thus constituting a transport body unit.

3. A conveyor system according to claim 2, in which said slat-like receiving plates have on their upper surfaces upright hair members which, when articles to be conveyed and sorted are supplied thereto at a position near the beginning of said conveyor, said hair members yield under the weight of said articles thereby restricting rolling of the articles and preventing the articles from moving on said receiving plates until the articles reach the sorting points.

4. A conveyor system according to claim 1, in which said slat-like receiving plates have on their upper surfaces upright hair members which, when articles to be conveyed and sorted are supplied thereto at a position near the beginning of said conveyor, said hair members yield under the weight of said articles thereby restricting rolling of the articles and preventing the articles from moving on said receiving plates until the articles reach the sorting points.

5. A conveyor system according to claim 1, in which the articles to be conveyed and sorted are foodstuffs which should be kept free from staining, and further comprising cleaning means facing the upper surfaces of the receiving plates which are in the vertically downward position after articles to be sorted have fallen off therefrom.

* * * * *